United States Patent [19]

Sato

[11] Patent Number: 4,882,641

[45] Date of Patent: Nov. 21, 1989

[54] METHOD FOR CONTROLLING MODE OF INFORMATION SIGNAL REPRODUCING APPARATUS

[75] Inventor: Junichi Sato, Kanagawa, Japan

[73] Assignee: Canon Kabushiki Kaisha, Tokyo, Japan

[21] Appl. No.: 43,879

[22] Filed: Apr. 29, 1987

[30] Foreign Application Priority Data

May 15, 1986 [JP] Japan .................................. 61-109689

[51] Int. Cl.[4] ........................ G11B 5/52; G11B 15/467
[52] U.S. Cl. .................................... 360/77.14; 360/70; 360/73.11; 360/73.06
[58] Field of Search ....................... 360/10.2, 10.3, 64, 360/8, 9.1, 70, 73, 77, 73.01, 73.04, 73.05, 73.06, 73.07, 73.09, 73.12, 77.01, 77.12, 77.13, 77.14, 77.15, 77.16, 18, 27, 73.11

[56] References Cited

U.S. PATENT DOCUMENTS

| | | | |
|---|---|---|---|
| 4,550,345 | 10/1985 | Terada et al. | 360/73 |
| 4,594,618 | 6/1986 | Kozuki et al. | 360/73.05 |
| 4,607,298 | 8/1986 | Yamashita | 360/73 |
| 4,663,673 | 5/1987 | Doutsubo | 360/73 |
| 4,680,638 | 7/1987 | Childs . | |
| 4,680,648 | 7/1987 | Takayama | 360/73 |
| 4,682,247 | 7/1987 | Doutsubo | 360/10.2 |
| 4,683,503 | 7/1987 | Takimoto | 360/73 |

Primary Examiner—Alan Faber
Assistant Examiner—Steven R. Garland
Attorney, Agent, or Firm—Robin, Blecker, Daley & Driscoll

[57] ABSTRACT

An information signal reproducing apparatus for reproducing an information signal from a recording medium on which a different pilot signals are recorded in a superimposed state upon the information signal in given rotation, with recording tracks formed at one of different selectable track pitches, is arranged: to generate, on the basis of the pilot signals reproduced by an information signal reproducing head, a tracking error signal indicative of the positional deviation of the head from one of the recording tracks; to count the number of times for which the positional deviation indicated by the tracking error signal reaches a predetermined degree for every given period of time; and to discriminate, on the basis of count value thus obtained, said one of track pitches at which the recording tracks are formed in recording.

6 Claims, 4 Drawing Sheets

FIG.2
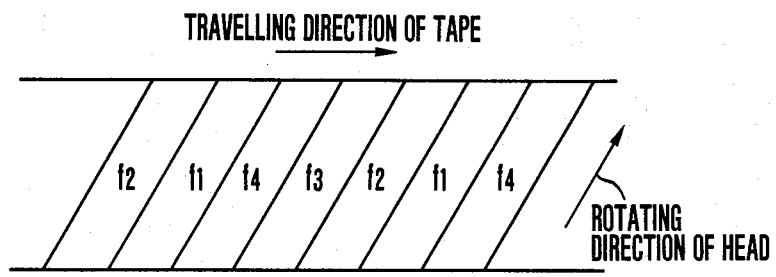
FIG.3
| REPRODUCED PILOT SIGNALS | REFERENCE PILOT SIGNALS |
|---|---|
| f1 | f1 |
| f2 | f4 |
| f3 | f3 |
| f4 | f2 |
FIG.4
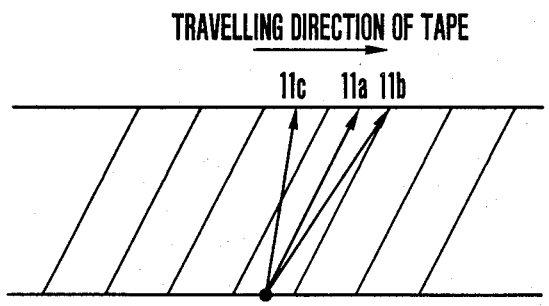

TRAVELLING DIRECTION OF TAPE

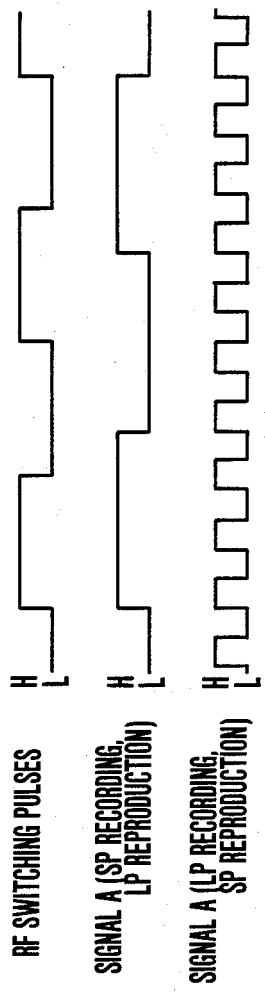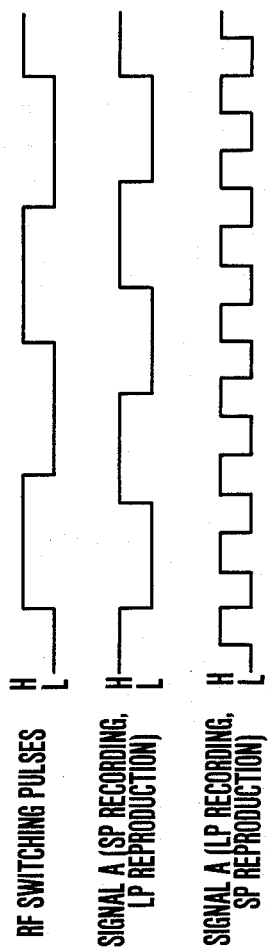

METHOD FOR CONTROLLING MODE OF INFORMATION SIGNAL REPRODUCING APPARATUS

BACKGROUND OF THE INVENTION

1. Field of the Invention:

This invention relates to an information signal reproducing apparatus and more particularly to an apparatus for reproducing an information signal from a recording medium on which a plurality of different kinds of pilot signals are recorded in a superimposed state on the information signal in predetermined rotation and recording tracks are formed at one of different track pitches.

2. Description of the Related Art:

Some of the rotary head type magnetic recording and reproducing apparatuses of the kind using a magnetic tape (hereinafter referred to as VTR) are arranged to permit selection of different tape travel speeds for recording and reproduction. In other words, they are arranged to be capable of setting different track pitches. The tape travel speed is arranged to be manually changed from one speed over to another by the operator in carrying out recording and to be automatically changed over to an appropriate speed at the time of reproduction by reproducing and using a control signal which is recorded along an edge part of the tape at intervals according to the track pitch employed. The control signal is obtained by frequency dividing a vertical synchronizing signal included in a video signal and is recorded at the edge part of the tape to be reproduced during reproduction. If the control signal is reproduced in a mode differing from a mode employed in recording, the frequency of the reproduced control signal becomes a different frequency. Therefore, during reproduction, the recording tape travel speed is discriminated by measuring the period of the reproduced control signal to find such difference in frequency.

The control signal is provided principally for the purpose of controlling a rotary head or a drive system in such a way as to have the head accurately positioned at an applicable track during reproduction.

Meanwhile, a tracking control method of a higher grade has recently appeared using pilot signals according to the so-called four frequency pilot method. The information signal recording and reproducing apparatus employing the four frequency pilot method does not have the above stated reproduced control signal. Therefore, the above stated tape speed discriminating method is not applicable to the apparatus of that type in case that the apparatus is required to have different tape speeds.

In view of this, a method for detecting a tape travel speed employed in recording has been proposed for the VTR of the type not recording the control signal. For example, U.S. Pat. No. 4,550,345 discloses a VTR which is arranged: To have a standard mode (hereinafter referred to as SP mode) and a long time mode (hereinafter referred to as LP mode) in which the tape travel speed in recording is slower than the speed of the SP mode; and to change the recording rotation of the four different pilot signals according to the SP mode or the LP mode. In other words, with the recording sequence or rotation in which these pilot signals are recorded changed from one rotation over to another, the reproducing tape travel speed is determined by detecting the mode employed in recording through a difference in the sequence of reproduced pilot signals resulting from the change-over of the recording rotation.

In accordance with the above stated arrangement, however, the rotation of the pilot signals must be changed from one rotation over to another according to a change in the recording tape speed. In cases where a VTR is desired to have more than three recording modes, however, it becomes difficult to set the recording rotation of the pilot signals and, for reproduction, a complex circuit must be used in discriminating the mode employed in recording. Besides, in the event of a recording medium (or tape) having pilot signals recorded along with an information signal in specific given sequence of rotation irrespectively of the recording mode (recording track pitch), it is impossible to discriminate the pitch at which the tracks are formed thereon.

SUMMARY OF THE INVENTION

It is therefore an object of this invention to provide an information signal reproducing apparatus which is capable of discriminating, during reproduction, the recorded mode of a signal on a recording medium on which there is recorded no track-pitch indicating signal nor any recording signal that is arranged to be recorded in different manners for different recording modes.

It is another object of this invention to provide an information signal reproducing apparatus which is capable of discriminating a recorded track pitch in reproducing an information signal from a recording medium even in cases where tracking control pilot signals are recorded on the medium in unvarying rotation irrespectively of any variations in the pitch of recorded tracks.

Under this object, an information signal reproducing apparatus which is arranged as an embodiment of this invention to reproduce an information signal from a recording medium having a plurality of different pilot signals recorded in a state of being superimposed upon the information signal in predetermined rotation, with recording tracks formed thereon at one of different selectable track pitches, comprises: a reproducing head arranged to reproduce the information signal from the recording medium; tracking error signal generating means arranged to generate, using the plurality of different pilot signals reproduced by the reproducing head, a tracking error signal which indicates the positional deviation of the reproducing head from one of said tracks; detecting means for detecting that the positional deviation indicated by the tracking error signal has reached a predetermined degree; count means for counting the number of times for which detection is made by the detecting means for every predetermined period of time; and discriminating means for discriminating, on the basis of the count value obtained by the count means, the pitch at which the tracks are formed.

It is a further object of this invention to provide an information signal reproducing apparatus which is capable of causing the traveling speed of a recording medium to coincide with the traveling speed employed in recording by using only a tracking error signal.

Under that object, an information signal reproducing apparatus which is arranged as another embodiment of this invention to reproduce an information signal from a recording medium having a plurality of different pilot signals recorded in a state of being superimposed upon the information signal in predetermined rotation, with recording tracks formed thereon at one of different selectable track pitches, comprises: a reproducing head arranged to reproduce the information signal from the recording medium; tracking error signal generating means arranged to generate, using the plurality of different pilot signals reproduced by the reproducing head, a tracking error signal which indicates the positional deviation of the reproducing head from one of the tracks; detecting means for detecting that the positional deviation indicated by the tracking error signal has reached a predetermined degree; count means for counting the number of times for which detection is made by the detecting means for every predetermined period of time; moving means for moving the recording medium; and moving speed determining means for determining the medium moving speed of the moving means on the basis of the count value obtained by the count means.

These and further objects and features of this invention will become apparent from the following detailed description of embodiments thereof taken in connection with the accompanying drawings.

BRIEF DESCRIPTION OF THE DRAWINGS

FIG. 2 shows the state of pilot signals recorded along with a video signal on a tape-shaped recording medium.

FIG. 3 shows reference pilot signals in relation to pilot signals reproduced from tracks under control.

FIG. 4 shows the scanning locus of a head obtained on a traveling tape during normal reproduction.

FIG. 8 shows the signal A produced from the comparator as in relation to the head switching pulses obtained during a search made in a normal direction.

FIG. 9 shows the signal A produced from the comparator as in relation to the head switching pulses obtained during a search made in a reverse direction.

DETAILED DESCRIPTION OF THE PREFERRED EMBODIMENT

Figure 1:
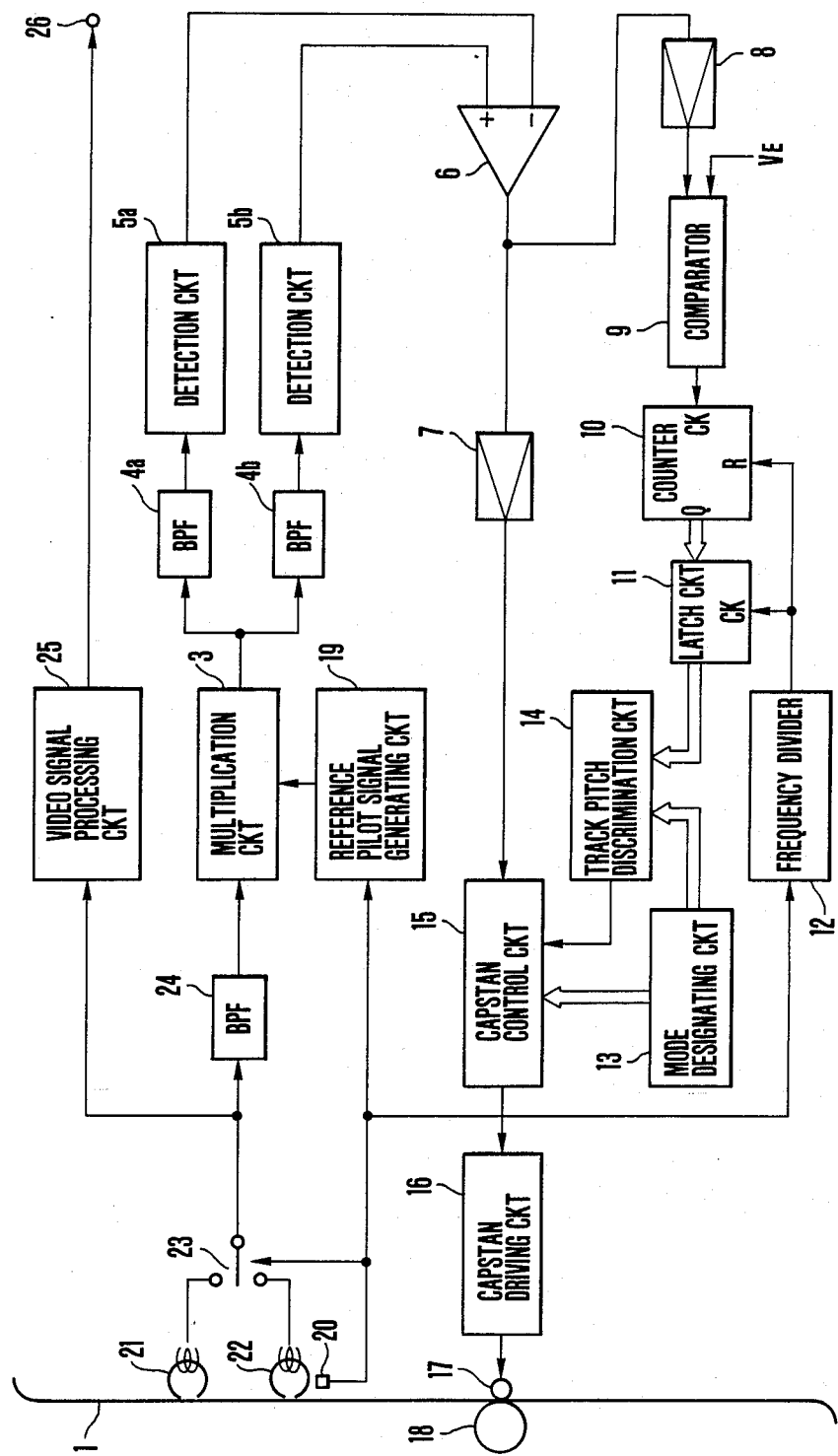
FIG. 1 is a block diagram showing an information signal reproducing apparatus arranged as an embodiment of this invention.

The following describes an embodiment of this invention: FIG. 1 shows in a block diagram and in outline the arrangement of an information signal reproducing apparatus embodying this invention.

In this case, the invention is applied to a VTR arranged to accomplish tracking control with pilot signals of four different frequencies recorded in rotation in a predetermined order in accordance with the known four frequency tracking control method irrespectively of the pitch at which the recording tracks are formed.

The four different frequencies of the pilot signals f1, f2, f3 and f4 are assumed to be f1=6.5fH, f2=7.5fH, f3=10.5fH and f4=9.5fH with "fH" representing the horizontal scanning frequency of the VTR. These pilot signals are recorded on a tape as shown in FIG. 2. In the case of FIG. 2, the pilot signals are recorded along with a video signal on a magnetic tape.

Signals reproduced by rotary heads 21 and 22 from the magnetic tape 1 are combined into a continuous signal by means of a head switch 23. The head switch 23 operates under the control of a head switching pulse signal of 30 Hz obtained from a head rotation phase detector 20. The output of the head switch 23 is supplied to a video signal processing circuit 25. The circuit 25 performs a known signal processing operation to give a reproduced video signal, which is then produced from a terminal 26.

Meanwhile, the output of the head switch 23 is supplied also to a band-pass filter (BPF) 24. The BPF 24 separates reproduced pilot signals from the video signal. The separated pilot signals are supplied to a multiplication circuit 3. The circuit 3 performs a multiplying operation on the pilot signals and reference pilot signals which are of the same frequencies as those of the pilot signals and are generated from a reference pilot signal generating circuit 19.

FIG. 3 shows correlation between the reproduced pilot signals obtained from recording tracks under control and the reference pilot signals generated by the generating circuit 19. Their correlation is as shown in FIG. 2 in this specific embodiment. The generation of the reference pilot signals is switched from one reference pilot signal over to another at timing controlled by the above stated head switching pulse signal.

The output signal of the multiplication circuit 3 is supplied to BPFs 4a and 4b. The BPFs 4a and 4b give pilot beat components of two frequencies fH and 3 fH relative to cross-talk components obtained from tracks located on both sides of a track under control. Detection circuits 5a and 5b perform a detecting operation on the two beat components. The outputs of the detection circuits 5a and 5b are subjected to a computing operation at a differential amplifier 6. The output of the differential amplifier 6 is amplified by an amplifier 7. As a result of this, a tracking error signal (hereinafter referred to as ATF signal) is obtained from the amplifier 7. The ATF signal is applied to a capstan phase control loop provided within a capstan control circuit 15, which is arranged to perform rotation phase control. Meanwhile, a signal A is obtained in the form of a binary signal with the output signal of the differential amplifier 6 amplified by another amplifier 8 and is compared with a give level at a comparator 9. This signal A is obtained for the purpose of discriminating the track pitch on the tape. The method for this discrimination is as described below:

Assuming that the recording by the VTR is arranged to be performed at two different tape speeds, recording and reproduction of signals with a track pitch obtained at a faster tape speed is, in this case, called the SP mode and recording and reproduction with a track pitch obtained at a slower speed the LP mode. The track pitch obtained in the SP mode is assumed to be two times as much as the track pitch obtained in the LP mode.

FIG. 4 shows the scanning locus of the head obtained while the tape is on the move. When a reproducing operation is performed in the same mode that is employed in recording, the scanning locus of the head is in parallel with the recording tracks as indicated by a scanning locus 11a in FIG. 4. In that case, a normal reproduced picture is obtained. If the record of tracks recorded in the SP mode is to be reproduced in the LP mode, the scanning locus of the head becomes as indicated by a locus 11b in relation to the tracks. Conversely, if the record of tracks recorded in the LP mode is to be reproduced in the SP mode, the locus of the head becomes as indicated by another locus 11c in FIG. 4.

Figure 5:
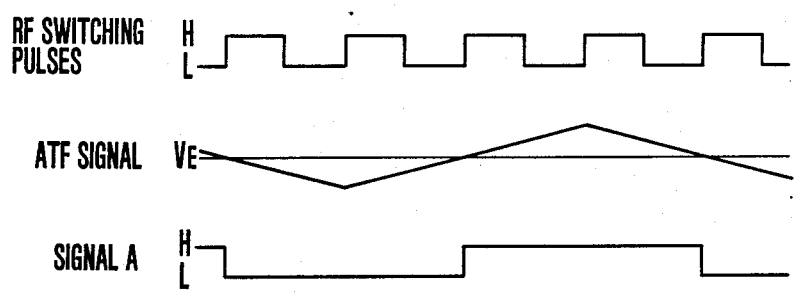
FIG. 5 shows an ATF signal and a signal A produced from a comparator as in relation to head switching pulses produced in case that a signal recorded in tracks in the SP mode is reproduced in the LP mode.

FIG. 5 shows the relation of the ATF signal and the signal A to head switching pulses which obtain when the record of tracks recorded in the SP mode is reproduced at the tape speed of the LP mode. In FIG. 5, a voltage VE indicates that the tracking error represented by the ATF signal is zero. This voltage VE is used as a reference voltage by the comparator 9. As apparent from FIG. 5, the period of the signal A is four times as long as that of the head switching pulses.

Figure 6:
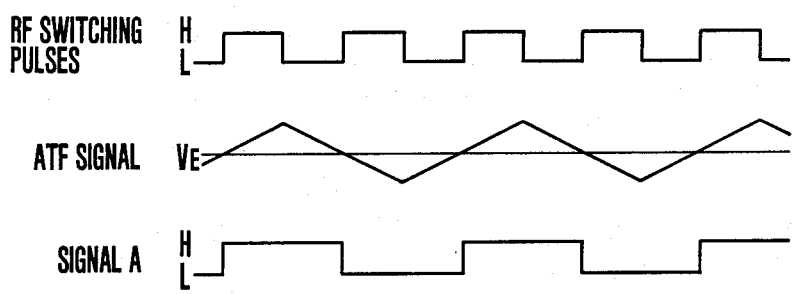
FIG. 6 shows the ATF signal and the signal A produced from the comparator as in relation to the head switching pulses produced in case that a signal recorded in tracks in the LP mode is reproduced in the SP mode.

FIG. 6 shows the relation of the ATF signal and the signal A to the head switching pulses which obtain when the record of tracks recorded in the LP mode is reproduced at the tape speed of the SP mode. As shown, the period of the signal A in this instance is two times as long as that of the head switching pulses.

Figure 7:
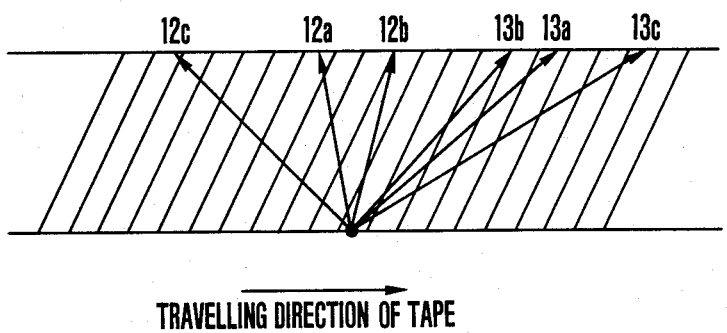
FIG. 7. shows the scanning locus of the head obtained during a searching operation.

The so-called high speed search is arranged to be accomplished in the following manner: A search at a five-times high speed in the forward direction and a search at a three-times high speed in the reverse direction are taken up here by way of example. FIG. 7 shows the loci of the head obtained during a search or look-up operation. In FIG. 7, a locus 12a of the head represents a search being performed at a five-times high speed in the forward direction. A locus 12b represents a search made in the forward direction by reproducing the record of tracks recorded in the SP mode at a tape speed five times as high as the tape speed of the LP mode. A locus 12c represents a search made in the forward direction by reproducing the record of tracks recorded in the LP mode at a tape speed five times as high as the tape speed of the SP mode. Loci 13a, 13b and 13c represent searches made in the reverse direction respectively in manners corresponding to the searches represented by the loci 12a, 12b and 12c. The track pitch of course varies with the mode employed. However, in each of FIGS. 4 and 7, the track pitch is shown as unvarying for the sake of simplification of illustration.

FIGS. 8 and 9 show the signal A in relation to the head switching pulse signal. As apparent from FIGS. 8 and 9, the period of the signal A is 4/3, 2/9, 4/5 or 2/7 of that of RF switching pulses.

As mentioned in the foregoing, when the reproducing mode differs from the recording mode, the signal A comes to have a given frequency determined by the tape travel speed and the track pitch in relation to the head switching pulses. Generally, when the tape is allowed to travel at a speed nv for reproduction of a record recorded at a tape speed v, the period of the signal A is $|2/(n-1)|$ times as much as the period of the RF switching pulses if the reproducing mode is the same as the recording mode; $|4/(n-2)|$ times as much as the latter if the record recorded in the SP mode is reproduced in the LP mode; and $|2/(2n-1)|$ times as much as the latter if the record recorded in the LP mode is reproduced in the SP mode.

In view of this a frequency divider 12 is arranged to frequency divide the head switching pulses and to generate one pulse for a period corresponding to several periods of the switching pulses. Meanwhile a counter 10 is arranged to count the rises or falls of the signals taking place during this period. A latch circuit 11 is arranged to supply the output of the counter 10 to a track pitch discrimination circuit 14. The track pitch discrimination circuit 14 is arranged to make a discrimination as to whether or not the reproducing mode is the same as the recording mode by using data obtained from a mode designating circuit 13 relative to a tape travel speed and data produced from the latch circuit 11. If the reproducing mode is found to differ from the recording mode, the capstan control circuit 15 causes the rotating speed of a capstan from one speed over to another accordingly. The embodiment further comprises a capstan driving circuit 16; the capstan 17; and a pinch roller 18 which is arranged to move the tape 1 in cooperation with the capstan 17.

While the normal reproducing operation and a high speed searching operation of the embodiment have been described in the foregoing, the invented arrangement is of course applicable also to other varied speed reproducing operations. Further, in discriminating the track pitch on the basis of the signal A, the embodiment is arranged to count the rises or falls of the signal A taking place within a period corresponding to several periods of the head switching pulses. However, the use of the head switching pulses for that purpose may be replaced with any other signals that has an unvarying period, such as pulses obtained by frequency dividing the output of a reference oscillator.

In the embodiment described, the relation of the reference pilot signals to the reproduced pilot signals is arranged to be as shown in FIG. 3. However, the reference pilot signals may be arrangement to have their frequencies coincide with those of the reproduced pilot signals. In that event, the output of the differential amplifier 6 is arranged to be inverted for every track.

Further, the output data of the latch circuit 11 may be arranged to be processed by means of a microcomputer or the like. Such arrangement makes it possible to discriminate the track pitch without recourse to any additional device and thus permits reduction in cost.

In cases where guard bands provided during SP recording bring about dead zones for tracking control, discrimination of the track pitch can be reliably accomplished with an excellent S/N ratio by providing a lowpass filter immediately before the comparator 9 to effect conversion into a digital signal.

What is claimed is:

1. An information signal reproducing apparatus for reproducing an information signal from a recording medium having a plurality of different pilot signals recorded in a superimposed state upon said information signal in predetermined rotation, with recording tracks formed thereon at one of different selectable track pitches, comprising:
   (a) moving means for moving said recording medium;
   (b) a reproducing head arranged to reproduce said information signal and said plurality of different pilot signals from said recording medium;
   (c) speed change-over means for changing over a recording medium moving speed of said moving means, said speed change-over means being arranged to set said recording medium moving speed to a plurality of different normal speeds at which said reproducing head traces said tracks in parallel therewith when said tracks are formed at the respective ones of said plurality of different track pitches and to a special speed at which said reproducing head does not trace said tracks in parallel therewith at any time when said tracks are formed at any one of said plurality of different track pitches;
   (d) tracking error signal generating means for generating, using said plurality of different pilot signals reproduced by said reproducing head, a tracking error signal which indicates a positional deviation of said reproducing head from one of said tracks;

(e) detecting means for detecting that the positional deviation indicated by said tracking error signal is a predetermined degree, to generate a detection pulse signal;

(f) a counter for counting said detection pulse signal during every predetermined period of time;

(g) a latch for latching a value of count of said counter at every predetermined period of time as mentioned above;

(h) mode setting means for setting the apparatus to a normal mode where said moving means moves the recording medium at a normal speed and to a special mode where said moving means moves the recording medium at said special speed; and (i) discriminating means for discriminating the track pitch of said track, on the basis of the mode set by said mode setting means and an output of said latch.

2. An apparatus according to claim 1, further comprising speed change-over means arranged to determine the recording medium moving speed of said moving means according to the result of discrimination made by said discriminating means and the mode set by said mode setting means.

3. An apparatus according to claim 1, wherein said reproducing head includes a rotary head, and said apparatus further comprises periodic signal generating means for generating a periodic signal relative to the rotating period of said rotary head and frequency dividing means for dividing the frequency of said periodic signal to produce a reference pulse signal.

4. An apparatus according to claim 3, wherein said counter is arranged to be reset by said reference pulse signal.

5. An apparatus according to claim 4, wherein said latch is arranged to operate according to said reference pulse signal.

6. An apparatus according to claim 1 further comprising:

tracking control means for controlling said moving means to have a tracing locus of said reproducing head on said medium coincide with one of said recording tracks, by using said tracking error signal.

* * * * *